June 2, 1925.  
M. C. WHITE  
PISTON  
Filed May 22, 1922    2 Sheets-Sheet 1

1,540,443

INVENTOR.  
Morris C. White  
By Arthur L. Slee  
ATTY

June 2, 1925.　　　　　　　　　　　　　　　　　1,540,443
M. C. WHITE
PISTON
Filed May 22, 1922　　2 Sheets-Sheet 2

INVENTOR.
Morris C. White
ATTY.

Patented June 2, 1925.

1,540,443

UNITED STATES PATENT OFFICE.

MORRIS C. WHITE, OF SAN FRANCISCO, CALIFORNIA.

PISTON.

Application filed May 22, 1922. Serial No. 562,688.

*To all whom it may concern:*

Be it known that I, MORRIS C. WHITE, a citizen of the United States, residing in the city and county of San Francisco and State of California, have invented a new and useful Improvement in a Piston, of which the following is a specification.

My invention relates to improvements in pistons and rings therefor adapted to increase the efficiency of internal combustion engines and the like by reduction of leakage from the cylinders thereof.

The primary object of my invention is to provide an improved piston and ring for internal combustion motors and the like.

Another object is to provide an improved piston ring mountable upon a piston to prevent leakage therepast.

A further object is to provide an improved piston ring adapted to be expanded by pressure within a cylinder to conform to the walls of same.

A further object is to provide a piston affording improved means for applying piston rings thereon to prevent distortion of the rings, and to facilitate replacement by new rings to compensate for wear upon either the rings or the cylinder.

Another object is to provide an improved piston of extremely light construction which will afford the necessary strength, and which will facilitate effective lubrication of the piston within the cylinder.

A still further object is to provide an improved construction and arrangement of rings upon a piston whereby the expandible character and the low coefficient of friction of certain alloyed metals may be utilized for increasing the efficiency of a motor.

I accomplish these and other objects by means of the device disclosed in the drawings forming a part of the present specification and drawings wherein like characters of reference are used to designate similar parts throughout said specification and drawings, and in which.

Figure 1:
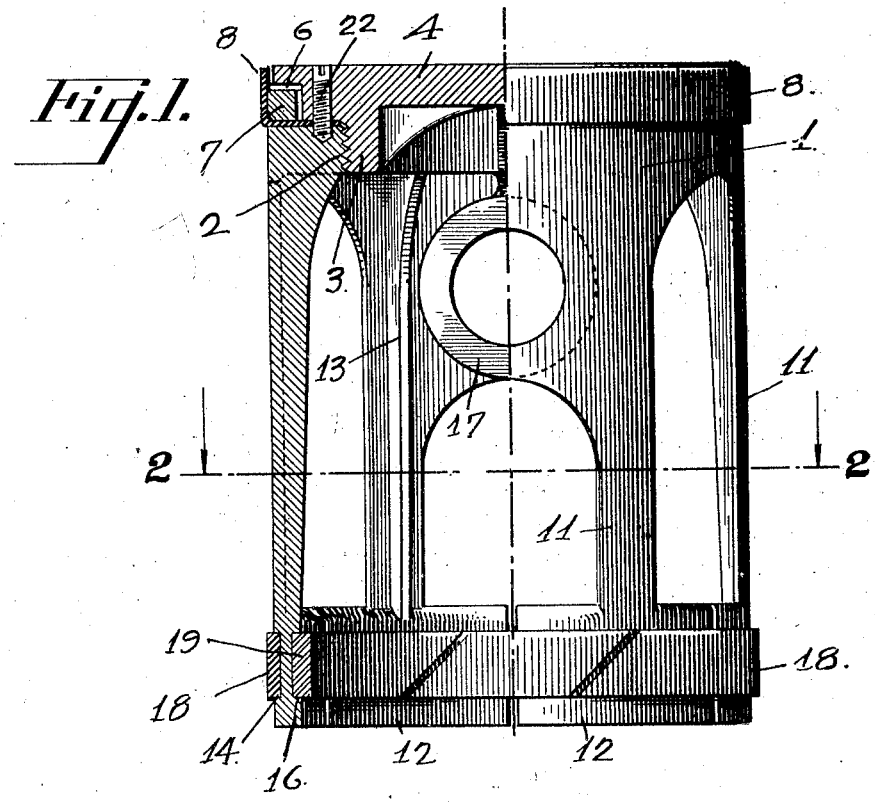
Fig. 1 is a view of my improved piston, one-half being shown in elevation and the other half in section.
Figure 2:
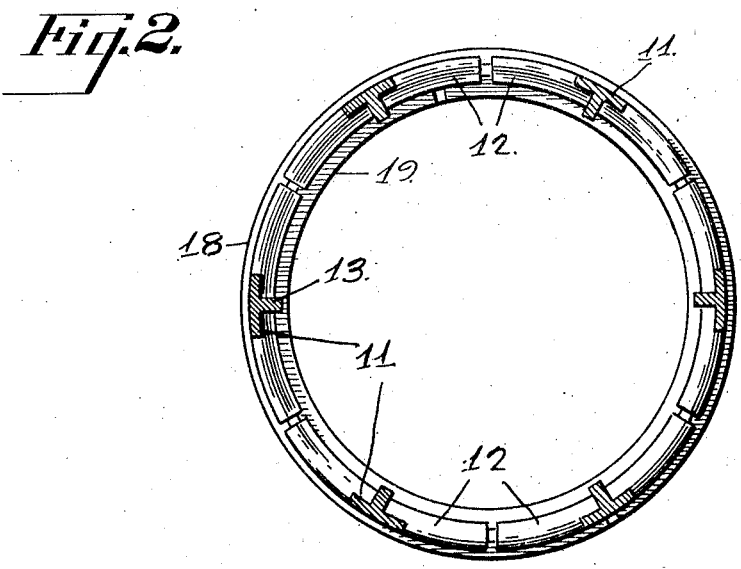
Fig. 2 is a section taken upon the line 2—2 of Fig. 1 in the direction indicated.

Referring to the drawings the numeral 1 is used to designate in general the body portion of a piston the head end of which is internally threaded as at 2 to receive a threaded extension 3 of a piston head 4. The head 4 is shouldered to form an annular groove 6 with the piston 1 arranged to receive a split piston ring 7 such as is commonly used upon the pistons of internal combustion engines, the diameter being slightly larger in diameter than the outside diameter of the head 4 and body 1.

Figure 3:
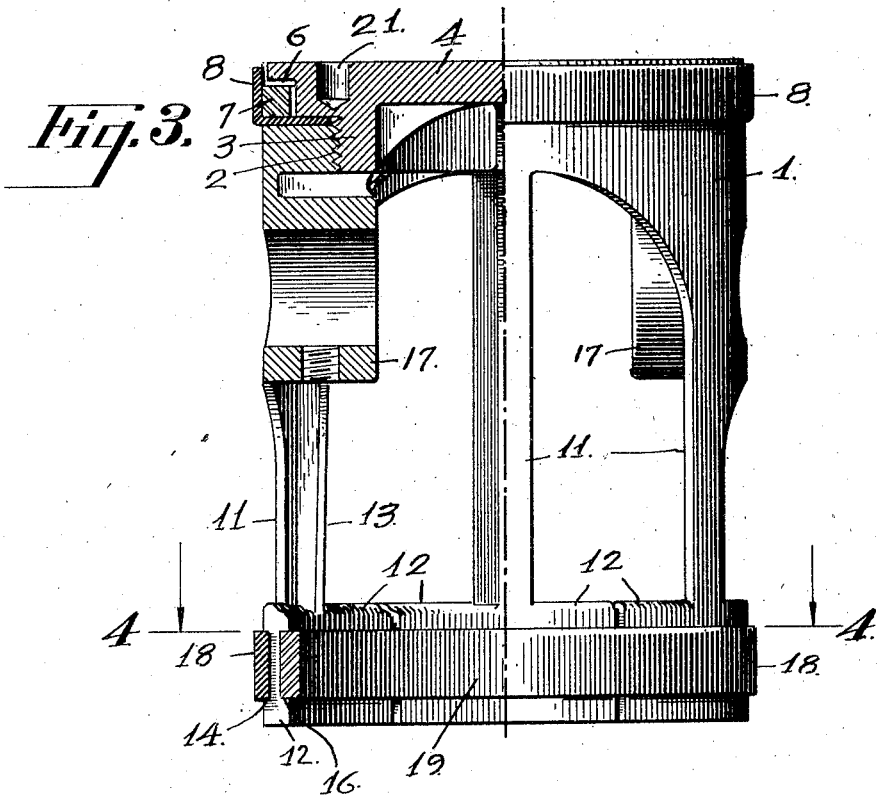
Fig. 3 is a view similar to Fig. 1 as viewed at right angles to said Fig. 1.
Figure 4:
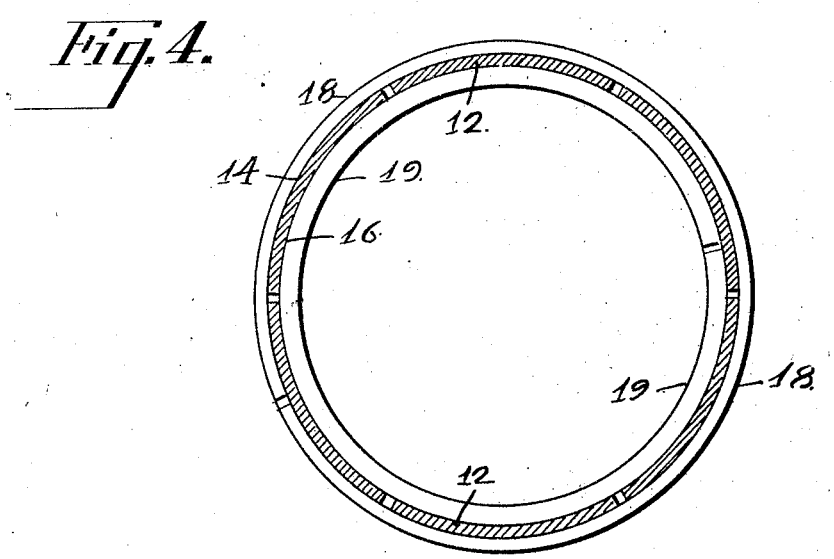
Fig. 4 is a section taken upon the line 4—4 of Fig. 3.

A piston ring 8 formed preferably from "Kelly" metal is shaped as a continuous cup shaped ring having an inwardly projecting flange portion arranged to be firmly secured between the head 4 and the body 1 when the threaded extension 3 of the head is screwed onto the body as shown in the sectional portions of Figs. 1 and 3 of the drawings. An outer rim portion of the ring 8 is disposed around the outer edge of the head 4, the ring 7 being thereby enclosed within the notch 6. When the piston 1 is mounted within a cylinder, not shown in the drawings, the continuous ring 8 is normally held slightly away from the head 4 and against the walls of the cylinder by the expansion of the split ring 7.

The continuous ring 8 is formed, as above mentioned, from "Kelly" metal which is a trade name for an alloy of copper, lead and graphite alloyed in the approximate proportion of 80 parts copper, 17 parts lead and 3 parts graphite. This alloy is of a highly ductile character having a very low coefficient of friction. The ductile properties of the metals permit the outer rim of the ring 8, which is made of a relatively slight thickness, to be readily flexed outwardly against the wall of the cylinder as the internal pressure of the cylinder enters between the rim and the head 4, said rim being normally expanded slightly away from the head by the pressure of the split ring 7. In this manner the ring 8 is firmly pressed against the cylinder wall with a force increasing in proportion to the pressure within the cylinder. The ductility of the metal causes the ring to readily conform to the cylinders in this manner compensating for any irregularity in the cylinder bore, this conformity being augmented by expansion of the metal due to the heat developed within the cylinder to obtain a substantially leak proof ring.

The body 1 of the piston is made of an open construction, affording extreme lightness, the lower portion of the body consisting of a plurality of legs 11 having rim segments 12 formed at the lower ends thereof. Reinforcing webs 13 are formed upon the inner sides of the legs 11 to give strength and rigidity to the body. The rim segments 12 of adjacent legs 11 are slightly spaced and are provided with grooves 14 and 16 upon the outer and inner sides respectively. Inwardly disposed lugs 17 formed upon opposite sides of the body 1 are bored to receive the usual wrist pins, not shown, in the customary manner.

The spaced rim segments 12 permit the rearward portion of the piston 1 to be contracted to receive a piston ring 18 within the outer groove 14, the legs 11 and segments 12 being pressed inwardly to permit the ring 18 to be applied thereover without undue distortion of the ring such as is often the cause of ill-fitting rings as applied upon pistons of the type now in common use.

The ring 18 is preferably made of "Kelly" metal as above described, to reduce friction against the cylinder wall and to insure conformity between the ring and the wall. The ring 18 may be made of continuous character if desired; however, as said ring serves only as a wearing shoe to guide and maintain the piston in correct relation to the cylinder wall, a split ring such as illustrated in the drawings may be used with equal efficiency.

A split ring 19 is mounted within the inner groove 16 to maintain the segments 12 expanded against the outer ring 18.

The body 1 is made of a diameter substantially less than the diameter of the cylinder bore, a clearance of from 1/32 to 3/64 being preferable in practice. This feature is of particular importance because of the fact that only the rings 8 and 18 are thus permitted to engage the cylinder and because of the further fact that the clearance between the body and the cylinder bore, combined with the open structure of the piston permits oil to be distributed over the entire wearing surface of the cylinder. One of the chief objections to the pistons of type commonly used is that the long solid skirt must in order to maintain compression be carefully machined to form a neat running fit within the cylinder, which fact combined with the common arrangement of rings materially reduces the effectiveness of the lubrication with the result that excessive wear occurs. This fact is chiefly responsible for cylinder scoring and piston slap with their resultant motor troubles and loss in efficiency. My improved piston permits oil to pass between the legs 11 onto the cylinder walls and by virtue of the substantial clearance allowed, to be evenly distributed between the body of the piston and the cylinder. This insures perfect lubrication and this, combined with the antifrictional properties of the rings above described reduces wear to a minimum and practically eliminates all danger of scoring. The piston slap is effectually prevented by the expandible character of the piston body, the spring resilience of the legs being ordinarily sufficient to maintain the ring 18 against the cylinder walls although the snap ring 19 is preferably provided to augment this action. In this connection it is also important to note that as the necessity of a neat fit between the piston and cylinder walls is eliminated there will be no necessity for discarding the pistons in event the wear upon the cylinder should become so great after long usage as to require reboring, a substitution of oversize rings being sufficient to restore the effectiveness of the original piston.

The head 4 is provided with recesses 21 adapted for engagement with a suitable spanner wrench for applying and removing the head from the forward end of the body 1. After the head has been initially assembled upon the body 1 and tightened against the flange of the ring 8, the head is bored and tapped to receive a screw 22 extending into the body 1 as shown in Fig. 1 of the drawings, in this manner rigidly holding the parts in assembled relation.

From the above description it will readily be seen that I have provided an improved piston of a strong, light construction wherein a single continuous piston ring effectually prevents leakage between the piston and the walls of a cylinder. As the reduction in compression due to leakage past the pistons causes one of the greatest losses in efficiency in internal combustion engines, it is obvious that the perfect sealing effect obtainable by the improved ring above described will result in a material gain in efficiency, the lightness of the construction, and the reduction in friction against the cylinder walls due to increased lubrication and the low coefficient of friction of the material used in making the rings, further adding to the effective gain in efficiency.

While I have disclosed the preferred construction of the device and specified the ring material now deemed most suited to the requirements named, it is obvious that both may be modified in many ways without departing from the spirit of my invention. I, therefore, do not restrict myself to the precise disclosure made, but wish to avail myself of all modifications and substitutions such as fall within the scope of the appended claims.

Having thus described my invention what I claim as new and desire to secure by Letters Patent is:

1. A piston comprising a body portion internally threaded at one end thereof; a head having a threaded extension engaging the threads of the body portion, said head being shouldered adjacent the body to form a groove; a split ring mounted within the groove; and a continuous ring of ductile metal rigidly secured between the head and the body, said ring being provided with an outwardly extending portion shaped to enclose the split ring and to be expanded thereby slightly away from the side of the head to permit internal pressure within the cylinder to enter between the head and the outwardly extending ring portion to expand the same against the wall of a cylinder to prevent leakage past the piston.

2. A piston comprising an open body portion the lower portion of which is formed from a plurality of legs spaced from each other and from the walls of a cylinder to admit oil therebetween; a head detachably secured upon said body portion; and a continuous ring of ductile metal secured between the head and the body portion, said ring being provided with an outer rim portion adapted to be expanded against the wall of a cylinder by pressure within said cylinder.

3. A piston comprising a body the lower portion of which is contractible; a ring mounted around said contractible portion; and a split ring mounted within said contractible portion to maintain the same expanded against the outer ring.

4. A piston comprising an open body portion, the lower portion of which is formed into a plurality of legs the ends of which are provided with segments forming a contractible rim; a ring mounted around said rim to engage the wall of a cylinder; and a ring mounted within said rim to maintain the legs and segments expanded against the outer ring.

5. A piston comprising an open body portion, the lower portion of which is formed into a plurality of legs the ends of which are provided with segments forming a contractible rim; a ring mounted around said rim to engage the wall of a cylinder; a ring mounted within said rim to maintain the legs and segments expanded against the outer ring; a continuous ring of ductile metal; and means for securing said ring upon the forward end of the body portion to engage the wall of the cylinder to prevent leakage past the piston.

6. A piston comprising a body the lower portion of which is an open structure consisting of a plurality of legs arranged to admit oil to the wall of a cylinder; a compression ring secured upon the head of the piston; and a guide ring secured upon the lower ends of the legs to guide the piston within a cylinder, said guide and compression rings being of a diameter substantially greater than the diameter of the piston body to prevent contact of said body with the walls of the cylinder.

7. A piston comprising a body portion the lower portion of which is an open structure consisting of a plurality of legs; a head detachably secured upon said body; a compression ring rigidly secured between the head and the body and extending outwardly therefrom to engage the wall of a cylinder; and a guide ring mounted upon the lower ends of the legs to engage the wall of the cylinder and guide the piston therein.

8. A piston comprising a body the lower portion of which is a contractible open structure consisting of a plurality of legs spaced from each other and from the wall of a cylinder, said body being internally threaded at the head end thereof; a head having a threaded extension adapted to engage the threads of the body; a continuous ring of ductile metal clamped between said head and the body, said ring extending outwardly into engagement with the wall of the cylinder; and a guide ring mounted upon the legs to guide the piston within the cylinder and prevent contact of the piston body with the cylinder wall.

In witness whereof I hereunto set my signature.

MORRIS C. WHITE.